US012810252B2

(12) United States Patent
Zhang

(10) Patent No.: US 12,810,252 B2
(45) Date of Patent: Nov. 24, 2026

(54) METHODS AND SYSTEMS FOR AUTOMATED TASK MANAGEMENT ACROSS IMPACTED NODES

(71) Applicant: T-Mobile Innovations LLC, Overland Park, KS (US)

(72) Inventor: Garret Zhang, Renton, WA (US)

(73) Assignee: T-Mobile Innovations LLC

( * ) Notice: Subject to any disclaimer, the term of this patent is extended or adjusted under 35 U.S.C. 154(b) by 133 days.

(21) Appl. No.: 18/646,574

(22) Filed: Apr. 25, 2024

(65) Prior Publication Data

US 2025/0335873 A1 Oct. 30, 2025

(51) Int. Cl.
*G06Q 10/10* (2023.01)

(52) U.S. Cl.
CPC .................................. *G06Q 10/103* (2013.01)

(58) Field of Classification Search
None
See application file for complete search history.

(56) References Cited

U.S. PATENT DOCUMENTS

| | | | | |
|---|---|---|---|---|
| 7,406,432 | B1 * | 7/2008 | Motoyama | G06Q 10/06 705/7.17 |
| 2008/0077530 | A1 * | 3/2008 | Banas | G06Q 10/06 705/50 |
| 2016/0062997 | A1 * | 3/2016 | Roussey | G06F 16/24552 707/736 |

OTHER PUBLICATIONS

D. Kildishev and A. Khoroshilov, "Developing Requirements Management Tool for Safety-Critical Systems," 2019 Actual Problems of Systems and Software Engineering (APSSE), Moscow, Russia, 2019, pp. 50-57, doi: 10.1109/APSSE47353.2019.00013. (Year: 2019).*

* cited by examiner

*Primary Examiner* — Laura Yesildag

(57) ABSTRACT

A method comprises generating a parent record in association with a project and a plurality of impacted nodes that are used to perform the project, in which the parent record comprises links to one or more child records associated with the project, generating a record in association with the project and a first impacted node, in which the child record comprises data describing a first task to be performed using the first impacted node and a first link to the parent record, detecting an update to the child record, updating the parent record based on the update to the child record.

20 Claims, 6 Drawing Sheets

METHODS AND SYSTEMS FOR AUTOMATED TASK MANAGEMENT ACROSS IMPACTED NODES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Various types of project management services have been developed to streamline the planning, execution, and monitoring of tasks for the completion of a project, enhancing collaboration and productivity. The management services may offer various features such as task assignment, timelines, and progress tracking. The applications may centralize the tasks that are to be performed to complete a project, debugging operations that may be performed for the project, and testing that may be performed for the project. For example, businesses may use management services to organize workflows, meet deadlines, and mitigate risks. The management services may also provide the ability to visualize project progress between different sectors of a business enterprise.

SUMMARY

In an embodiment, a method implemented in a communication network to perform automated project and task management across one or more impacted nodes is disclosed. The method comprises generating, by a management application at a management system in the communication network, a functional requirements document based on project parameters describing a project and an identification of a plurality of impacted nodes that are impacted by one or more tasks associated with the project, in which the functional requirements document indicates functionalities expected from each of the impacted nodes to perform the project. The method further comprises generating, by the management application, a parent record in association with the project, in which the parent record comprises links to one or more child records associated with the project, generating, by the management application, an internal child record in association with the project and a first impacted node, in which the internal child record comprises data describing a first task to be performed using the first impacted node and a first link to the parent record, and generating, by the management application, an external child record in association with an external project and a second impacted node, in which the external child record comprises data describing a second task to be performed using the second impacted node for the external project and a second link to the parent record. The method further comprises detecting, by the management application, an update to at least one of the internal child record or the external child record, updating, by the management application, the parent record based on the update to the at least one of the internal child record or the external child record, and updating, by the management application, the functional requirements document based on the update to the at least one of the internal child record or the external child record.

In another embodiment, a method implemented in a communication network to perform automated project and task management across one or more impacted nodes is disclosed. The method comprises generating, by a management application at a management system in the communication network, a parent record in association with a project and a plurality of impacted nodes that are used to perform the project, in which the parent record comprises links to one or more child records associated with the project, generating, by the management application, an internal child record in association with the project and a first impacted node, in which the internal child record comprises data describing a first task to be performed using the first impacted node and a first link to the parent record, and generating, by the management application, an external child record in association with an external project and a second impacted node, in which the external child record comprises data describing a second task to be performed using the second impacted node for the external project and a second link to the parent record. In an embodiment, the method further comprises detecting, by the management application, an update to at least one of the internal child records or the external child record, updating, by the management application, the parent record based on the update to the at least one of the internal child records or the external child record, and generating, by a service management application at the management system, a test child record in association with the project and a test node, wherein the test child record comprises data describing a test to be performed using the test node for the project and a third link to the parent record.

In an embodiment, a system comprising at least one processor, at least one non-transitory memory coupled to the processor, and a management application is disclosed. The management application is stored in the at least one non-transitory memory, and when executed by the at least one processor, causes the management application to be configured to generate the functional requirements document based on project parameters describing a project and an identification of a plurality of impacted nodes that are impacted by one or more tasks associated with the project, in which the functional requirements document indicates functionalities expected from each of the impacted nodes to perform the project, generate a parent record in association with the project, in which the parent record comprises links to one or more child records associated with the project, generate a child record in association with the project or an external project and an impacted node, in which the child record comprises a first link to the parent record, generate a test child record in association with the project and a test node, in which the test child record comprises data describing a test to be performed using the test node for project and a second link to the parent record, detect an update to at least one of the child records or test child record, update the parent record based on the update to the at least one of the child records or test child record, and update the functional requirements document based on the update to the at least one of the child records or test child record.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
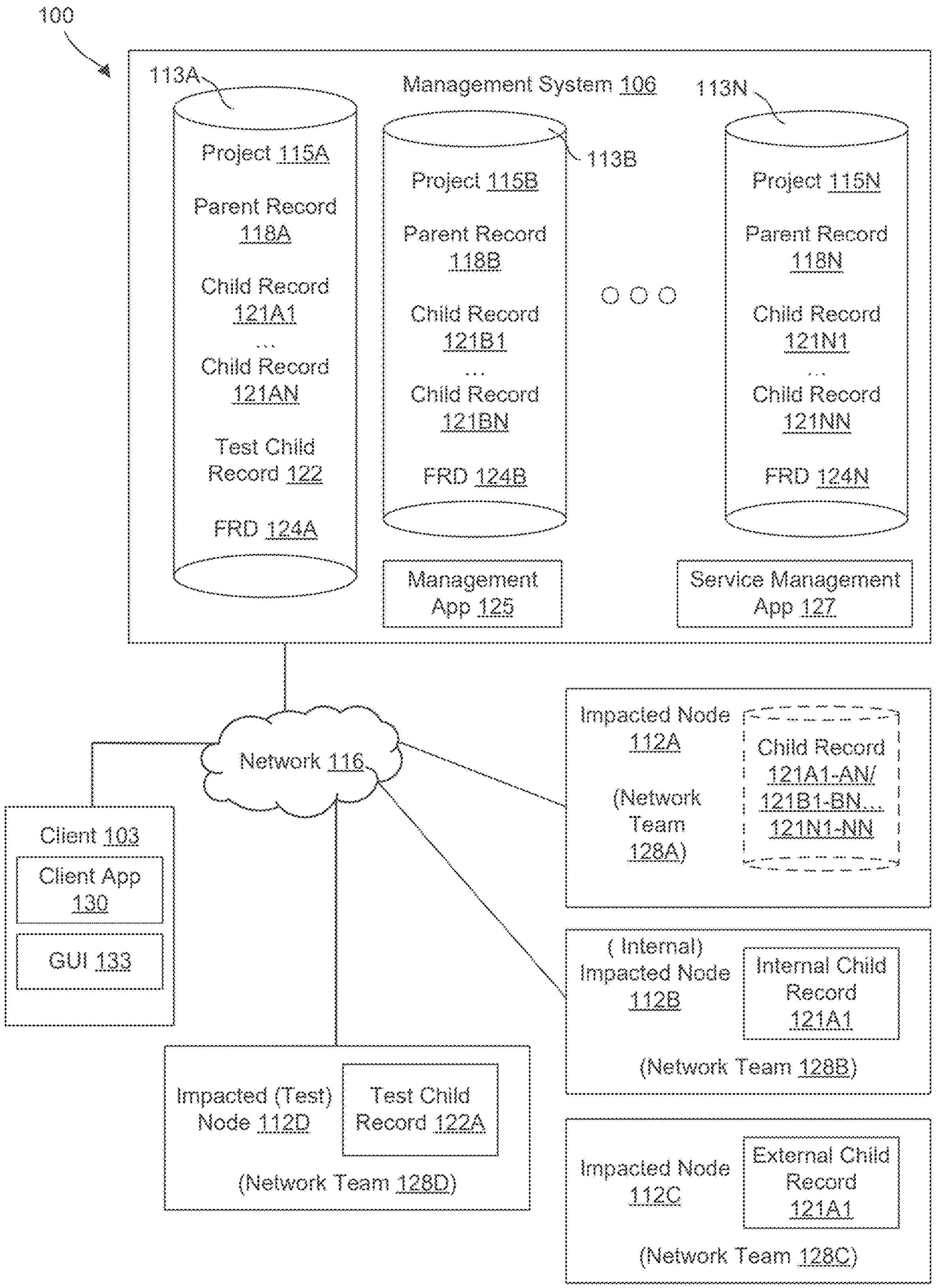
FIG. 1 is a block diagram of a communication network according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A business enterprise may conceive innovative project ideas driven by business requirements, for example, seeking to enhance operational efficiency, enhance customer or employee experiences, or address market needs. A project may refer to a focused initiative within a business enterprise, often driven by specific business and operational objectives (e.g., developing a new feature, improving system functionality, or addressing business needs). A project may involve the coordinated efforts between different network teams, each of which may perform various actions and tasks manually or via a computer system in an enterprise network. The business requirements of a project may be manually documented in a proposal, such as an operational requirement document.

A management application (e.g., project management application) may be implemented to coordinate the actions and tasks performed by the different network teams in an effort to advance the project. The application may facilitate planning, execution, and collaboration among teams by streamlining various processes, such as task assignment, timelines, progress tracking, document sharing, etc. To this end, a management application may organize a project into multiple records (sometimes referred to as "issues"). Each record may describe a work item or task that may be tracked and managed within a project. For example, each record may include information such as task details, assignees, statuses, etc., and may be used to represent various aspects, such as bugs, features, user stories, etc.

In some cases, records may be organized in a hierarchical manner, with a parent record representing an overarching project, and a child record denoting specific tasks allocated to different network teams to perform the project. Each network team may be assigned relevant child records, in which each child record outlines the responsibilities to be performed by a network team. The network team may perform the tasks using one or more nodes. The nodes may be, for example, computer systems, electronic switches, electronic routers, software services, virtual private networks (VPNs), applications, and/or any other type of network element (NE). The nodes may also, at least in part, refer to a person or people in the network team, that may perform one or more tasks. In this way, the nodes may perform or be used to perform various tasks/actions on behalf of a project.

The management application may also integrate with testing various aspects of the project, using different child records serving as test cases. For example, the enterprise system may include test nodes, similar to the aforementioned nodes, in which the test nodes receive test assignments in the form of child records. The test nodes may execute tests related to the expected performance of the project and report findings. In this way, management applications may indeed be transparent and collaborative through the use of different records related to various aspects of the project.

A network team may update an assigned child record within a project by modifying information in the child record. The modified information may include, for example, a status, progress, or description that accurately reflects the current state of the tasks or work item assigned to the network team. For instance, if a network team is tasked with implementing a new software feature, the network team may update a child record to signify completion of the coding phase, indicating a transition to the testing phase. In this way, regular updates to child records may be used to implement precise tracking of project progress and contribute to the overall success of the project.

However, management applications may not communicate the updates to the child records, and other related records (e.g., parent/child records) in an efficient manner. For example, tracking updates to records may involve constant communications and monitoring of the records, using repetitive emails, direct messages via various types of applications, team synchronizations, etc. In some cases, the updates to the records may only be communicated manually, making the communications prone to errors and inefficiencies. These errors may result in miscommunications, missing deadlines, delays, etc., in completing a project. Further, each network team may manage numerous projects, with various tasks being performed for the different projects, and thus numerous records for each of the tasks. In this way, tracking and communicating updates to the records may be largely resource intensive, from a processing and network load perspective.

In addition, management applications may not be programmed to manage cross-project records at different nodes in an efficient manner. For example, a management application creating child records at different nodes for a first project, may not consider the impact of the first project on other projects that may be performed at the same nodes. Even further, existing project management applications may have technical coding limitations (e.g., else if statements and/or nested if statements may not be permitted), making it increasingly different to program more efficiencies into existing project management applications. In this way, the management application may not be programmed to create records associated with different nodes across different projects. This in turn may lead to technical problems during the performance and execution of the tasks for a project, such as, for example, delays, missed tasks, incorrect sequence of tasks, missed dependencies, etc.

The present disclosure addresses the foregoing technical problems by providing a technical solution in the technical field of resource deployment and management for project management applications. The embodiments disclosed herein are directed to a management system including a management application that manages records that include data related to each project. In particular, the management application may create child records for a current project while also creating child records for external projects based on an impact of the current project on external projects being performed across impacted nodes. The management application may also communicate updates between related records and various documents related to the current project to ensure that all related records and documents maintain the most up-to-date and accurate data. In this way, the embodiments disclosed herein are far more resource and network efficient, by seamlessly and automatically communicating updates between records on an as-needed basis (i.e., rather than constantly monitoring and communicating updates via messages and emails). The embodiments disclosed herein also enable cross-project records to be created based on the current project impacting performance or tasks of external projects, thereby preventing the technical problems (e.g., delays, pausing, incorrect computations, etc.) from occurring at the external projects.

The embodiments disclosed herein may be implemented in a communication network, which may include a client, the management system, and multiple nodes accessible by the management system and controlled by one or more network teams of a business enterprise. As mentioned above, the nodes may be hardware equipment or software services/applications that may perform various tasks and actions for multiple projects. The client may be a device (e.g., computer, handheld device, etc.) that includes a graphical user interface (GUI), through which a user may provide information describing a project (e.g., business requirements) to implement a project, managed by the management system.

In operation, a user operating the client may run a client application that communicates with the management application at the management system. The client application operates at the client-side to receive details regarding a current project from a user, and the management application operates at the server-side to implement various actions and tasks to complete the current project. The user may provide project parameters (e.g., project-related details) via, for example, user interface elements provided on a user interface displayed at the client by client application. For example, the user may provide the project parameters for the current project by entering or selecting data related to the requirements via the user interface, or by uploading an operational requirements document (ORD) detailing the requirements for the current project in a high-level format. An ORD may primarily include operational aspects and considerations for the ongoing maintenance, support, and management of a project (e.g., performance, reliability, scalability, security, etc.).

The user may also input an identification of the nodes that are impacted by the project (also referred to herein as impacted nodes) into the user interface. For example, the user interface may display a listing of the nodes in the communication network, and the user may select (e.g., via a toggle, drop down menu, or select button associated with each node) the impacted nodes of the current project. In some cases, the impacted nodes may each be associated with a network team responsible for performing a task for the current project, or for performing tasks for other external projects that may be impacted by performance of a task for the current project. As further described herein, child records may be created based on the impacted nodes identified by the user.

In some cases, the user may also provide test parameters via the user interface of the client. The test parameters may include testing guidelines and/or different tests that may be performed on the project or data associated with the project to verify that the project is meeting the expectations indicated in the project parameters. In this way, the user may provide, via the client, the project parameters describing the current project, an identification of the impacted nodes of a current project and/or external projects, and the test parameters indicating tests to be performed for the current project.

The client application may then package this information together and transmit this information to the management application at the management server. The management server may then generate a Functional Requirements Document (FRD) for the current project based on the information received from the client application. The FRD may include data describing the specific functionalities and features that the project may be expected to deliver to meet the business requirements indicated in the project parameters. The FRD may include, for example, use cases, user stories, detailed descriptions of functional modules, input/output specifications, and other information that may guide the network team in building desired functionalities for the project. In some cases, the FRD may indicate functionalities expected from each of the impacted nodes to perform the current project or the tasks of the current project.

The management application may also generate a parent record (also sometimes referred to as an "epic") based on the information received from the client application (e.g., the project parameters, identification of impacted nodes, and test parameters). The parent record may include data describing an overview of the current project, overarching work items, tasks, and tests to complete the current project, and dependencies to other records (e.g., child records), as further described herein. For example, the parent record may include a summary of the current project, a description of the current project, an assignee of the current project, and other metadata that describes the higher-level project or initiatives of the project. The parent record may also include data from the related records (e.g., child records) as a way to view and track progress of all of the tasks/actions being completed by different network teams for the current project, as further described herein. For example, the parent record may include some or all of the data that is included in all of the linked/related child records.

Once the parent record is created, the management application may identify one or more of the impacted nodes (based on the identification of the impacted nodes from the client application) that is independent from other external projects that may also be at least partially performed at the impacted node. These identified impacted nodes may be referred to as internal impacted nodes that are internal to the current project, and independent from the other external projects (e.g., not impacted by other projects and does not impact other projects). The internal impacted nodes may be, for example, nodes that may perform or may be used to perform one or more tasks for the current project. The management application may have access to data describing ongoing projects associated with the impacted nodes, and may be programmed to identify the internal impacted nodes based on the data.

In this case, the management application may loop through all of the internal impacted nodes to generate a child record (sometimes referred to herein as an internal child record), including data describing a first task to be performed by or using an internal impacted node. The internal child record may also include a link to the parent record, which may be a pointer or some other type of association to the parent record. This link may be used to ensure that any updates performed at the child record are communicated up to the linked parent record, such that the parent link is updated. For example, when a network team updates a field of the internal child record, the link may serve to trigger the management application to obtain the update to the field of the internal child record, and input the same update into the parent record that is linked to the internal child record. In this way, the parent record and the internal child record maintain the same updated field using the link.

The management application may also identify one or more of the impacted nodes (received from the client application) that may be performing a task or action for an external project that may be impacted or affected by the tasks performed for the current project. These identified impacted nodes may be referred to as external impacted nodes that are external to the current project, in a sense that the impacted nodes are running other projects that are affected by the current project. The external impacted nodes may be, for example, nodes that may perform or may be used to perform one or more tasks for the current project and one or more other external projects. The management application may have access to data describing ongoing projects associated with the impacted nodes, and may be programmed to identify the external impacted nodes based on the data.

In this case, the management application may loop through all of the external impacted nodes to generate a child record (sometimes referred to herein as an external child record), including data describing a second task to be performed by or using an external impacted node. The second task may be related to the project and/or an external project. The external child record may also include a link to the parent record.

The management application may also identify test nodes, which may perform tests to ensure the expected performance of a project. The management application may submit a ticket to a service management application of the management server based on the test parameters received from the client application. The ticket may include details of a test to be performed by a particular test node. The details of the test may be included in the parent record. The service management application may then create test child record for the test to be performed by the test node. The test child record may include data describing the test to be performed in relation to the project and a link back to the parent record.

In an embodiment, the management application may monitor tests performed by the test nodes on the project or data associated with the project. The management application may update the test child record (or the parent record and/or child record) during the testing phase. In this way, data associated with the tests may be monitored, tracked, and used to update different records automatically and seamlessly while the testing is actually performed on the project or data.

In some cases, each of the records may also include custom fields, that have been customized to include particular types of data that facilitate performing the tasks for the project according to the embodiments disclosed herein. In some cases, the record (e.g., parent record, child record, test child record) may be embodied as a page (e.g., webpage or application page) being displayed on a user interface of a device. In this case, the record may include custom fields for the internal impacted nodes (e.g., a selectable list of the impacted nodes that are internal to the project), the external impacted nodes (e.g., a selectable list of impacted nodes that are external to the project), a generate button that begins automation to create the aforementioned parent, child, and test child records for a current project, and a project source field identifying a source that generated the record (e.g., the management application or service management application).

When a child record is updated (e.g., a status of a task indicated in the child record is updated) by a network team operating an impacted node, the management application may be notified of this update. The management application may obtain (e.g., receive) the update at the child record, and then input the update into the parent record that is linked to the child record. In this way, the parent record may maintain the most up-to-date accurate data from all linked child records to maintain the most up-to-date accurate overview of a current status and operation of the project.

Similarly, the management application may also update the FRD when applicable based on the updates to child records. For example, when a child record is updated in a manner that affects an expected function across one or more impacted nodes, the management application may determine that the update to the child record changes the expected function across the one or more impacted nodes. The management application may update the FRD to reflect change in function of the one or more impacted nodes.

In the other direction, when the parent record and/or the FRD is updated, this may cause changes to existing child records, transferring assignment of child records from one impacted node to another, removing of certain child records, or the addition of new child records. The management application may obtain the updates to the parent record and/or the FRD, and then determine the updates/changes that may be performed to existing child records or additions of new child records accordingly. In doing so, the management application may ensure that duplicate records are not created based on an examination of existing records.

In an embodiment, the creation of the child records and the bidirectional updates between the child records/parent record are performed automatically, using one or more automations defined for a project management platform or environment. For example, the child records may be immediately and automatically generated in association with the impacted nodes when the user inputs the impacted nodes into the user interface. Alternatively or in addition, a user (e.g., engineer) may use the same user interface to manually create the child records based on the data input into the user interface (as opposed to automatically creating the child records). For example, the user may first input the identification of the impacted nodes into the user interface, and then after completing and reviewing the inputted impacted nodes, the user may select a user interface element (e.g., icon, button, drop down menu, etc.) in the user interface to trigger the management application to create the child records in association with the impacted nodes only when the user interface element is selected. This may be beneficial in situations when the user does not want to immediately create the child records, but instead prefers to review the impacted nodes to confirm accuracy and completeness prior to creating the child records across the impacted nodes. This prevents child records from being incorrectly and inefficiently created across the impacted nodes when an error has been input into the user interface during identification of the impacted nodes. This may also enable the user to flexibly create child issues via the user interface.

In an embodiment, additional child records may be created at a later time (after the initial input of the impacted nodes at the user interface). Certain project management platforms may not permit a user to input additional impacted nodes at a later time (e.g., when the project has entered the testing phase). This may be because the project management platforms may create duplicate child issues for the same project when additional impacted nodes are input into the platform in association with the project (i.e., the platform may not be able to differentiate between the previously identified impacted nodes and the newly identified impacted nodes). The management application may be programmed to receive inputs regarding newly identified impacted systems for a project, and the management application may create additional child records in association with the newly identified impacted nodes (while ensuring that the previously created child records are not created again). The management application may maintain records related to the previously created child records to prevent the duplication of the child records when new child records are being created. In this way, the management application is enabled to differentiate between previously identified impacted nodes and newly identified impacted nodes, to efficiently create child records for the project without duplicating prior child records.

In this way, the embodiments disclosed herein serve to implement a more efficient and seamless method for project management and cross-project tracking. The management application may strategically create parent records and child records across the current project and multiple different projects. The related records (e.g., parent and corresponding child records) may have links to one another, such that the parent record maintains up-to-date details that are included in the corresponding child records. The management application may be responsible for updating parent, child records, and the FRD based on updates across any of the records. By managing cross-project records and links between the records, the projects may be managed more accurately, ultimately ensuring the timeliness of completing their projects. This in turn leads to a more efficient use of processing and networking resources within the communication network to complete multiple projects for one or more business enterprises.

Turning now to FIG. 1, a communication network 100 is described. The communication network 100 includes a client 103, a management system 106, impacted nodes 112A-D, and network 116. The network 116 may be one or more private networks, one or more public networks, or a combination thereof. The client 103, management system 106, impacted nodes 112A-D, and network 116 may be interconnected by wired or wireless communication links. In some cases, the client 103 may communicate with the management system 106 via a wireless link implemented by a cell site. The cell site may provide a wireless communication link to the client 103 according to a 5G, a long term evolution (LTE), a code division multiple access (CDMA), or a global system for mobile communications (GSM) wireless telecommunication protocol. The network 116 may be one or more private networks, one or more public networks, or a combination thereof. While the management system 106 and the impacted nodes 112A-D are displayed in FIG. 1 as being external to the network 116, it should be appreciated that in some embodiments, the management system 106 and the impacted nodes 112A-D may be part of the network 116.

A client 103 may be a user equipment (UE) or any type of device with a display. For example, the client 103 may be a cell phone, a mobile phone, a smart phone, a personal digital assistant (PDA), an Internet of things (IoT) device, a wearable computer, a headset computer, a laptop computer, a tablet computer, or a notebook computer. The client 103 may include a client application 130 and a graphical user interface (GUI) 133. The client application 130 may be instructions stored on a non-transitory memory of the client 103, which when executed by a processor of the client 103, may cause the client application 130 to perform the steps disclosed herein. The client application 130 may cause the GUI 133 to display a page (e.g., webpage or application page) associated with a project management service. The user of the client 103 may enter, via the GUI 133, project parameters describing a current project (e.g., operational and/or business requirements of the current project) and an identification of one or more impacted nodes associated with the current project, and other external projects that may in some way relate to or be dependent on the current project. The user may also enter test parameters for the current project via the GUI 133. For example, the user may provide the project parameters by entering or selecting data via the GUI 133, or by uploading an ORD describing the requirements for the projects via the GUI 133. The user may also select the impacted nodes that may be impacted by the current project using the GUI 133. The user may also select or manually provide the test parameters regarding one or more tests to be performed before completion of the project to ensure the project meets expectations or requirements. The client application 130 may package the project parameters, the test parameters, and the identification of the impacted nodes, all associated with the current project, to the management system 106.

The management system 106 may be a computer system, server software/hardware, or a collection of processors, memories, and/or networking resources, used to implement a management application 125 and a service management application 127. For example, the management system 106 may be a cloud-based system, located at a data center or distributed across multiple data centers. The management application 125 and the service management application 127 may each include instructions stored on a non-transitory memory of the management system 106 that when executed by a processor of the management system 106, causes the management system 106 to perform various steps as further disclosed herein.

The management system 106 also includes data stores 113A-N, each storing data for a different project 115A-N that may be managed by the management system 106. In the example shown in FIG. 1, data store 113A may store data for a current project 115A, based on the project parameters, test parameters, and identification of the impacted nodes received from the client application 130. Data stores 113B-113N may store data for external projects 115B-115N, different from the current project 115A. Each of the projects 115A-N may be different projects associated with a single business enterprise, for example. As mentioned above, a project 115A-N may generally refer to a focused initiative within a business enterprise, often driven by specific business requirements. A project 115A-N may involve the coordinated efforts of various network teams, each of which may perform various actions and tasks manually or via nodes or elements in the communication system 100. The data store 113A-N may store the project-related data received for each of the projects 115A-N.

Each of the data stores 113A-N may also store a parent record 118A-N for each of the projects 115A-N. As described above, the parent record 118A-N includes a general high-level overview of the project 115A-N, and may include a link to each of the associated child records 121A1-121AN, 121B1-121BN, . . . 121N1, 121NN. Each of the data stores 113A-N may also store the child records 121A1-121AN, 121B1-121BN, . . . 121N1, 121NN for each of the projects 115A-N. Specifically, data store 113A may store child records 121A1-AN for project 115A, data store 113B may store child records 121B1-BN for project 115B, . . . and data store 113N may store child records 121N1-121NN for project 115N. As mentioned above, each child record 121A1-121AN, 121B1-121BN, . . . 121N1, 121NN may include data regarding specific tasks performed for the project 115A-N. Each of the data stores 113A-N may also include test child records 122 for each project 115A-N. As mentioned above, a test child record 122 may include data describing a test being performed for a project 115A and a link to the parent record 118A. While the test child record 122 is only included in the data store 113A for project 115A in FIG. 1, it should be appreciated that data stores 113B-N for projects 115B-N may also include test child records 122 for other tests being performed across test nodes in relation to a project 115B-N. Each of the data stores 113A-N may also store an FRD 124A-N for each project 115A-N. The FRD 124A may include data describing the specific functionalities and features that the project 115A-N may be expected to deliver to meet the business and operational requirements of the project 115A-N.

Continuing with the example described above, the management application 125 may receive the project parameters, test parameters, and the identification of the impacted nodes for a current project 115A from the client application 130. The management application 125 may then generate a FRD 124A for the current project 115A based on the data received from the client application 130. For example, the data used to generate the FRD 124A may be based on the project parameters or the ORD received from the client application 130 of the client 103.

The service management application 127 may generate the test child record 122 based on test parameters received from the client application 130, which again may indicate details regarding one or more tests to be performed for the project 115A. The test child record 122 may include data describing a test to be performed at a test node and the expected results of performing the test. The test child record 122 may also include a link back to the parent record 118.

The impacted nodes 112A-D may refer to hardware equipment, software artifacts, and/or members of a network team 128A-D, all of which may perform a task for a project 115A-N or may be used for performing a task for a project 115A-N. The impacted nodes 112A-D may be managed by a network team 128A-D, and may be associated with, and in some cases store, an associated child record 121A1-AN, 121B1-BN, . . . 121N1-NN. In this way, an individual in the network team 128A-D may modify the associated child record 121A1-AN, 121B1-BN, . . . 121N1-NN. As shown in FIG. 1, the impacted node 112A may be managed by a network team 128A, and may be associated with one or more child records 121A1-AN, 121B1-BN, . . . 121N1-NN.

The impacted node 112B may be an internal impacted node 112B associated with the network team 128B. The internal impacted node 112B may be impacted by the completion of tasks for a project 115A, but may not be impacted by the completion of tasks for external projects 115B-N, and may not otherwise impact the completion of tasks for external projects 115B-N. In this way, the performance of one or more tasks for project 115A at the internal impacted node 112B is independent of other external projects 115B-N. As described herein, the management application 125 may create an internal child record 121A1 for the internal impacted node 112B and the current project 115A (not other projects 115B-N).

The impacted node 112C may be an external impacted node 112C associated with network team 128C. The external impacted node 112C may be impacted by the completion of tasks for a project 115A, and may also be impacted by the completion of tasks for external projects 115B-N and/or may otherwise impact the completion of tasks for external projects 115B-N (e.g., tasks that are being performed for external projects 115B-N may be impacted by the completion of tasks for project 115A). The external impacted node 112C may be responsible for performing tasks for the current project 115A and tasks for external projects 115B-N, where some of these tasks may be related, interfering, or dependent on one another. For example, a value that is computed based on performing a task for an external project 115B may be impacted (e.g., changed) when a task is performed for the project 115A. The management application 125 may determine that some additional task (e.g., debug operation or other action) may be performed on behalf of the external project 115B to change the value after performing the task for project 115A. As described herein, the management application 125 may create an external child record 121B1 for the external impacted node 112B and the external project 115B (not the current project 115A). That is, while the management application 125 is creating child records 121A1-121AN for the project 115A, the management application 125 may also create additional child records 121B1-BN-121N1-NN. For external projects 115B-N.

The impacted node 112D may be a test node 112D associated with network team 128D, which may be a team associated with a test lab. The test node 112D may perform a test for the current project 115A or may be used to perform a test for the current project 115A. For example, the service management application 127 may determine, based on test parameters received from the client application 130 for the current project 115A, that a test should be performed for the project 115A at the test node 112D. As described herein, the management application 125 may create a test child record 122 for the test node 112D and the current project 115A.

It should be appreciated that the communication network 100 may include any number of impacted nodes 112A-D, even though FIG. 1 only indicates four impacted nodes 112A-D. Each of the impacted nodes 112A-D may not necessarily be owned and operated by a single business enterprise. Some of the impacted nodes 112A-D may be owned and operated by other business enterprises, separate from the business enterprise associated with a particular project 115A-D.

Figure 2:
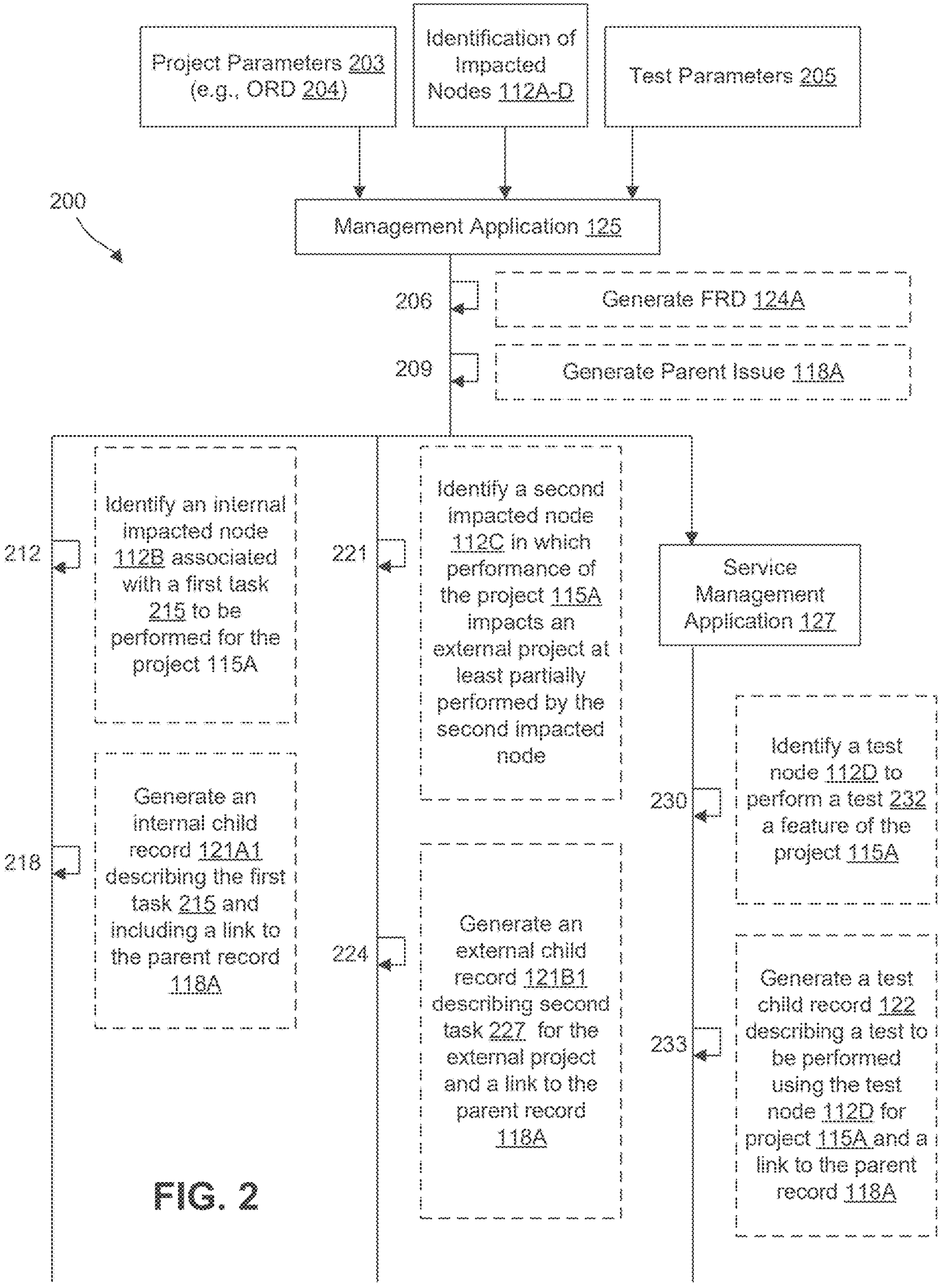
FIG. 2 is a block diagram illustrating an end-to-end flow for automated task management across impacted nodes in the communication network of FIG. 1 according to various embodiments of the disclosure.

Referring now to FIG. 2, a block diagram illustrating a method 200 for automated task management across impacted nodes 112A-D in the communication system 100 of FIG. 1 is shown. Method 200 may begin with the client application 130 of the client 103 receiving input data from a user of the client 103, the input data describing various features, requirements, and operational parameters of a current project 115A to be managed by the management system 106. For example, the input data received may include project parameters 203, an identification of impacted nodes 112A-D, and test parameters 205.

As mentioned above, the project parameters 203 may include data describing the current project 115A, such as operational or business requirements of the current project 115A. For example, suppose the current project 115A is related to launching a mobile application for an enhanced customer experience. The project parameters 203 may include data describing the expectations and requirements for the mobile application to enhance customer experience to a particular threshold. As an illustrative example, the project parameters 203 may include project objectives (clearly defined objectives and goals for the mobile application), general feature requirements, user stories that represent the application functionalities from a user perspective, design specifications (e.g., user interface requirements), timelines and milestones, network team assignments, dependencies between tasks and teams, etc. In some cases, the project parameters 203 may be outlined in an ORD 204.

The test parameters 205 may include development and testing guidelines, describing quality assurance processes with a project, and in some cases, an expected result for each test performed for a project 115A. For example, the test parameters 205 may include coding standards, version control, security considerations, and a description of various performance testing. The performance testing may be performed at test nodes 112D to ensure that the application functions optimally under various conditions. For example, the various conditions may occur when there are heavy user loads or fluctuations in network connectivity. In some cases, the test parameters 205 may also be outlined in the ORD 204.

The identification of impacted nodes 112 may include identifiers or identifications of the impacted nodes 112A-D. The identifications may be in the form of a list, selected by a user via the GUI 133 at the client 103. The identification of the impacted nodes 112A-D may include names, addresses, identifiers, or other form of identification of the impacted nodes 112A-D (and/or a network team 128A-D associated with the impacted nodes 112A-D).

The management application 125 may receive the project parameters 203, the identification of the impacted nodes 112A-D, and the test parameters 205 from the client application 130, and begin processing this data to manage completion of the tasks and actions for completion of the current project 115A. At step 206, the management application may generate the FRD 124A for the current project 115A, for example, based on the project parameters 203. In particular, the FRD 124A may include detailed specifications of features and functionalities that are expected to provided by the project (e.g., the mobile application described above). The FRD 124A may outline the specific functionalities and features of each of the impacted nodes 112A-D to deliver the tasks of the current project 115A. For example, the FRD 124A may include an overview of the current project 115A, a scope and/or objectives of the current project 115A, target user groups/characteristics, detailed descriptions of functional features (e.g., user registration/authentication, account management, bill payment and invoice viewing, real-time usage tracking, personalized service offerings, etc.), design requirements (e.g., user interface requirements), application navigation and user flow, performance and security requirements, testing criteria dependencies, etc.

At step 209, the management application may generate a parent issue 118A describing the project 115A. The parent issue 118A may include various fields including text and values describing features, attributes, requirements, etc., of the project 115A. Continuing with the mobile application example described above, the parent issue 118A may include a description of the project 115A (e.g., the objectives of the projection), key tasks/components of the project 115A that may be indicated in child records 121A1-AN, a timeline indicating due dates for key phases of the current project 115A (e.g., development sprints, testing cycles, planned launch date, etc.), assignees (e.g., network teams 128A-D responsible for carrying out the tasks indicated in each child record 121A1-AN), dependencies between the tasks and the network teams 128A-D, sequence or reliance of the tasks or other aspects of the current project 115A, a status of the overall progress of the current project 115A (e.g., in progress, on track, delayed, completed, etc.), etc. The key tasks/components of the current project 115A included in the parent issue 118A may include, for example, one or more fields of child records 121A1-AN (or test child record 122) related to developing specific features for the application, quality assuring and testing, user interface design, regulatory compliance, etc.

As shown in FIG. 2, method 200 may then branch out into three separate threads, which may be performed in parallel simultaneously or in a particular sequence depending on the tasks that are to be performed for the project 115A. In the first thread, at step 212, the management application 125 may identify an internal impacted node 112B associated with a first task 215 to be performed for the project 115A. As mentioned above, the internal impacted node 112B may be impacted by the completion of tasks for a project 115A, but may not be impacted by the completion of tasks for other projects 115B-N, and may not otherwise impact the completion of tasks for other projects 115B-N. At step 218, the management application 125 may generate an internal child record 121A1 describing the first task 215 and/or the internal impacted node 112B.

For example, the internal child record 121A1 may include various fields describing the first task 215 (e.g., development of specific features of the mobile application), an assignee of the first task 215 (e.g., the internal impacted node 112B), a status of the first task 215 (e.g., in progress, on track, delayed, completed, etc.), dates associated with the first task 215 (e.g., deployment date, due dates), a priority of the first task 215, etc. The internal child record 121A1 may also include a link to the parent record 118A. Additional detail regarding the fields that may be included in the internal child record 121A1 is further described below with reference to FIG. 3.

In the second thread, at step 221, the management application 125 may identify an external impacted node 112C, that may be performing tasks or actions for other external projects 115B-N in addition to tasks or actions for the current project 115A. The performance of a task for the current project 115A at the external impact node 112C may impact an external project 115B-N, or a task being performed at the external impact node 112C for the external project 115B-N. In this way, the external impacted node 112C may be impacted by the completion of tasks for a current project 115A, and may impact the completion of tasks for other external projects 115B-N at the external impacted node 112C. At step 224, the management application 125 may generate an external child record 121B1 describing a second task 227 for the external project 115B-N. The second task 227 may be based on an impact of performing a task for the current project 115A on an external project 115B-N being performed at the external impact node 112C (e.g., the impact may be a change in a value of an attribute associated with an external impacted node 112C). For example, the second task 227 may be a debug or reverse task action that may be performed to adjust or reverse the change in the value of the attribute associated with the external impacted node 112C.

Similar to the internal child record 121A1, the external child record 121B1 may include various fields describing the second task 227, an assignee of the second task 227 (e.g., the external impacted node 112C), a status of the second task 227 (e.g., in progress, on track, delayed, completed, etc.), dates associated with the second task 227 (e.g., deployment date, due dates), a priority of the second task 227, etc. The external child record 121B1 may also include a link to the parent record 118A. Additional detail regarding the fields that may be included in the external child record 121B1 is further described below with reference to FIG. 3.

Method 200 may then move on to the service management application 127, along the third thread. At step 230, the service management application 127 may use the test parameters 205 and then identify a test node 112D to perform a test 232 on a feature of the project 115A based on an expected result. The test node 112D may be designated for performing a requested type of test 232. At step 233, the service management application 127 may then generate a test child record 122 including data describing the test 232 that is to be performed by or using the test node 112D for the project 115A and the expected result. Similar to the internal child record 121A1, the test child record 122 may include various fields describing the test 232, an assignee of the test 232 (e.g., the test node 112D), a status of the test 232 (e.g., in progress, on track, delayed, completed, etc.), dates associated with the test 232 (e.g., deployment date, due dates), a priority of the test 232, etc. The test child record 122 may also include a link to the parent record 118A.

For example, a lab team may be a preexisting project with predefined logic, flow, attributes, processes, systems, automations, implementations, configurations, etc. Test child records 122 may created in association with the lab team while aligning with the preexisting configurations and implementations of the lab team. In other words, while performing steps 230 and 233 (e.g., as an automation) the management application 125 may send a ticket to the service management application 127 related to the generation of the test child record 122. The service management application 127 may convert, encode, format, normalize the ticket received from the management application 125 to obtain a lab team ticket. The lab team ticket may be used, for example, by the service management application 127, to generate the test child record 122 in association with the lab team. In some cases, the lab team ticket and the ticket created by the management application 125 may be linked records (e.g., linked together for bidirectional updates to ensure that both tickets maintain consistent data).

In an embodiment, the management application 125 may send different types of notifications to different users or clients in response to one or more trigger events. For example, when one or more impacted nodes are no longer considered impacted by a project (e.g., trigger event), the management application 125 may generate and send a notification to the user/engineer that no additional work may be needed for the parent record at the impacted node. When the parent record (e.g., project) is cancelled, the management application 125 may generate and send a notification to an assignee of a child record that the parent record is closed and rollback may be required. When the parent record (e.g., project) is escalated (e.g., may be manually triggered by the user/engineer), the management application 125 may generate and send a notification to the assignees and all of the child records that the parent record has been escalated, to update the child records. When an assignee field has changed in a parent record or child record, the management application 125 may generate and send a notification to the original assignee of the child record and the parent record that the assignee has changed to a new assignee. When an attachment is added to a child record or a parent record, the management application 125 may generate and send a notification to all of the child records that a new FRD has been published. When a MOP submission request is manually triggered by a user/engineer, the management application 125 may generate and send a notification to all of the child records that the project is ready for lab testing, and the MOPs are to be sent to the parent record. When lab testing is successful, the management application 125 may generate and send a notification to all of the child records that the lab test was successful, and that a change request is to be submitted to start the final deployment process. When a status has changed in the parent record (e.g., project), the management application 125 may generate and send a notification to a wholesale team (e.g., user, engineer, operator, assignees, etc.) of the project indicating that a status has changed in the parent record. When a due date has changed in the parent record (e.g., project), the management application 125 may generate and send a notification to the wholesale team that a due date has changed in the parent record. When the parent record (e.g., project) has closed or completed, the management application 125 may generate and send a notification to the wholesale team indicating that the parent record has closed or completed. There may be nine sync field automations, that either sync field from parent to child record or from child to parent record.

Figure 3:
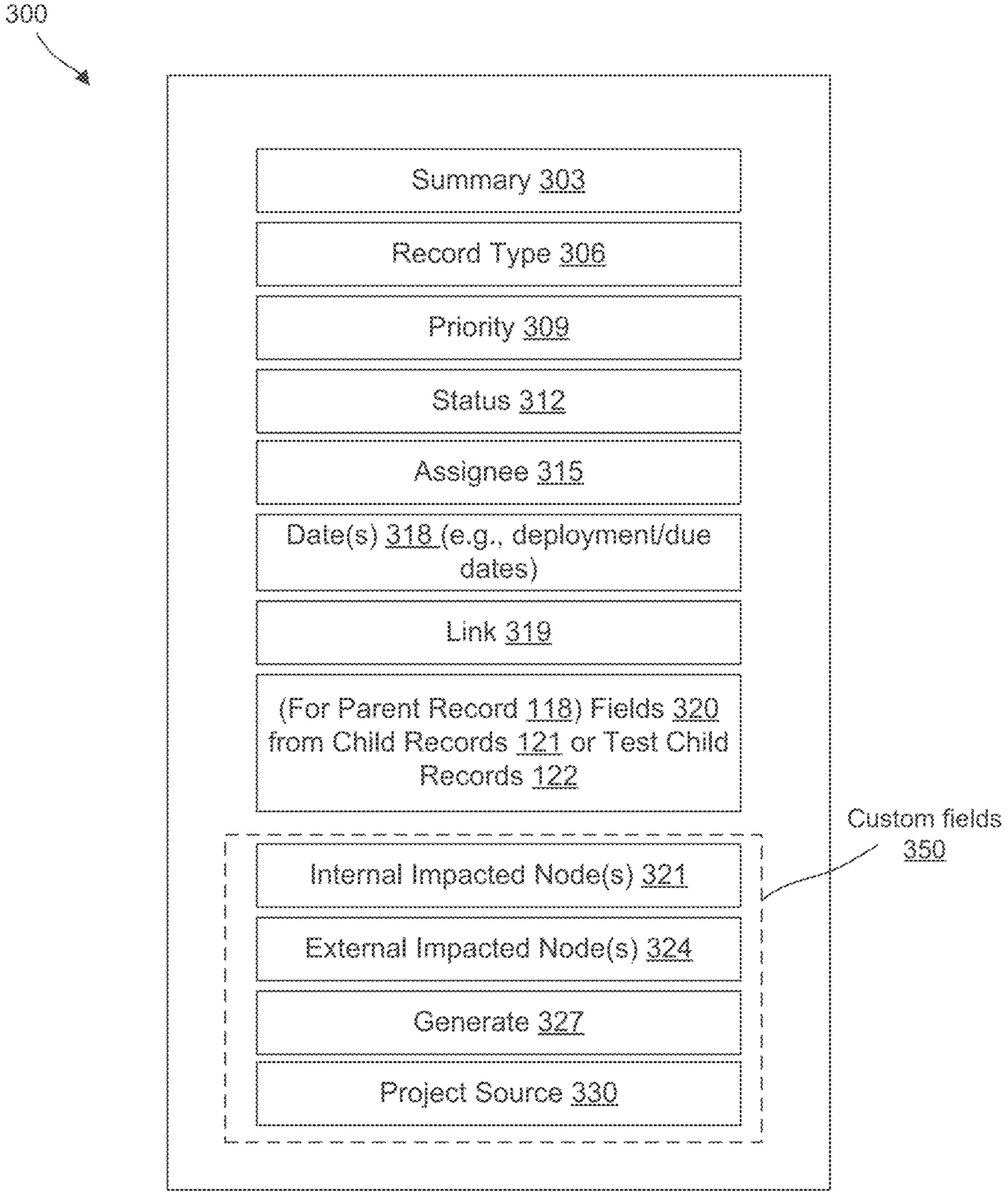
FIG. 3 is a diagram illustrating an example of a parent record or a child record for a project in a communication network of FIG. 1 according to various embodiments of the disclosure.

Referring now to FIG. 3, shown is an example of a record 300. The record 300 may be embodied as a parent record 118A-N (hereinafter referred to as a parent record 118), a child record 121A1-AN, 121B1-BN, . . . 121N1-NN (hereinafter referred to as child records 121, a test child record 122, or a combination thereof. The record 300 may include some baseline fields, such as the summary 303, record type 306, priority 309, status 312, assignee 315, dates 318, links 319, fields 320 from child records 121. The record 300 may also include some custom fields 350, which may have been newly added to records 300 that are created and used by project management systems and applications, such as the management system 106 and the management application 125.

The summary 303 may be a brief, descriptive title that summarizes the project 115A-N (hereinafter referred to as project 115) or the task that is described in the record 300. The summary 303 may also include a description with more detail and context on the project 115 or the task. The record type 306 may specify a type of the record 300 (e.g., task, story, bug, epic, etc.). The priority 309 may indicate an importance or urgency of the record 300 (e.g., high, medium, low). The status 312 may represent a current stage or state of the project 115 or task within a workflow (e.g., open, in progress, resolved). An assignee 315 may refer to individuals or network teams 128A-D (hereinafter referred to as network teams 128) responsible for working on the project 115 or tasks. The dates 318 may indicate, for example, a deployment date of the project 115 and/or task, and/or a due date by which the project 115 and/or the task is expected to be complete.

The links 319 may represent an association, connection, or relationship between multiple records 300 (e.g., parent/child records), whether within the same project 115 or across different projects 115. The links 319 may establish a directional or bidirectional association, allowing users to navigate related issues. In some cases, the links 319 may include pointers, names, address, and/or other identifications of related records 300, denoting dependencies, relationships, or references, providing context and facilitating traceability within the management system 106.

When the record 300 is a parent record 118, the record 300 may include data or fields 320 from all of the linked child records 121 and/or test child records 122. For example, the fields 320 may include the summary, status, and assignee of all of the child records 121 and/or test child records 122 linked with the record 300 (i.e., the parent record 118).

The custom fields 350 mentioned above may include internal impacted nodes 321, external impacted nodes 324, a generate (e.g., button) field 327, and a project source 330. When the record 300 is embodied as a page being displayed on a user interface, such as the GUI 133 or other user interface at the management system 106-side, internal impacted nodes 321 and the external impacted nodes 324 may be selectable listings of the identified internal impacted nodes 321 (e.g., internal impacted node 112B) and external impacted nodes 324 (e.g., external impacted nodes 324) specific to a project 115. The listing of internal impacted nodes 321 identify impacted nodes 112 that are independent of external projects 115, and the listing of external impacted nodes 324 identify impacted nodes 112 that run external projects 115 and are impacted by the current project 115.

In this same context in which the record 300 is embodied as a page being displayed on the user interface, the generate field 327 may be a user interface button or selectable icon. When the generate field 327 is selected, the steps 206, 209, 212, 218, 221, 224, 230, and 233 of method 200, for example, may be automatically performed by the management system 106 in the background to facilitate efficient and effective completion of a given project 115. The project source 330 may include an identifier or other identification of a source or entity creating the record 300 (e.g., the management application 125 or the service management application 127).

Figure 4:
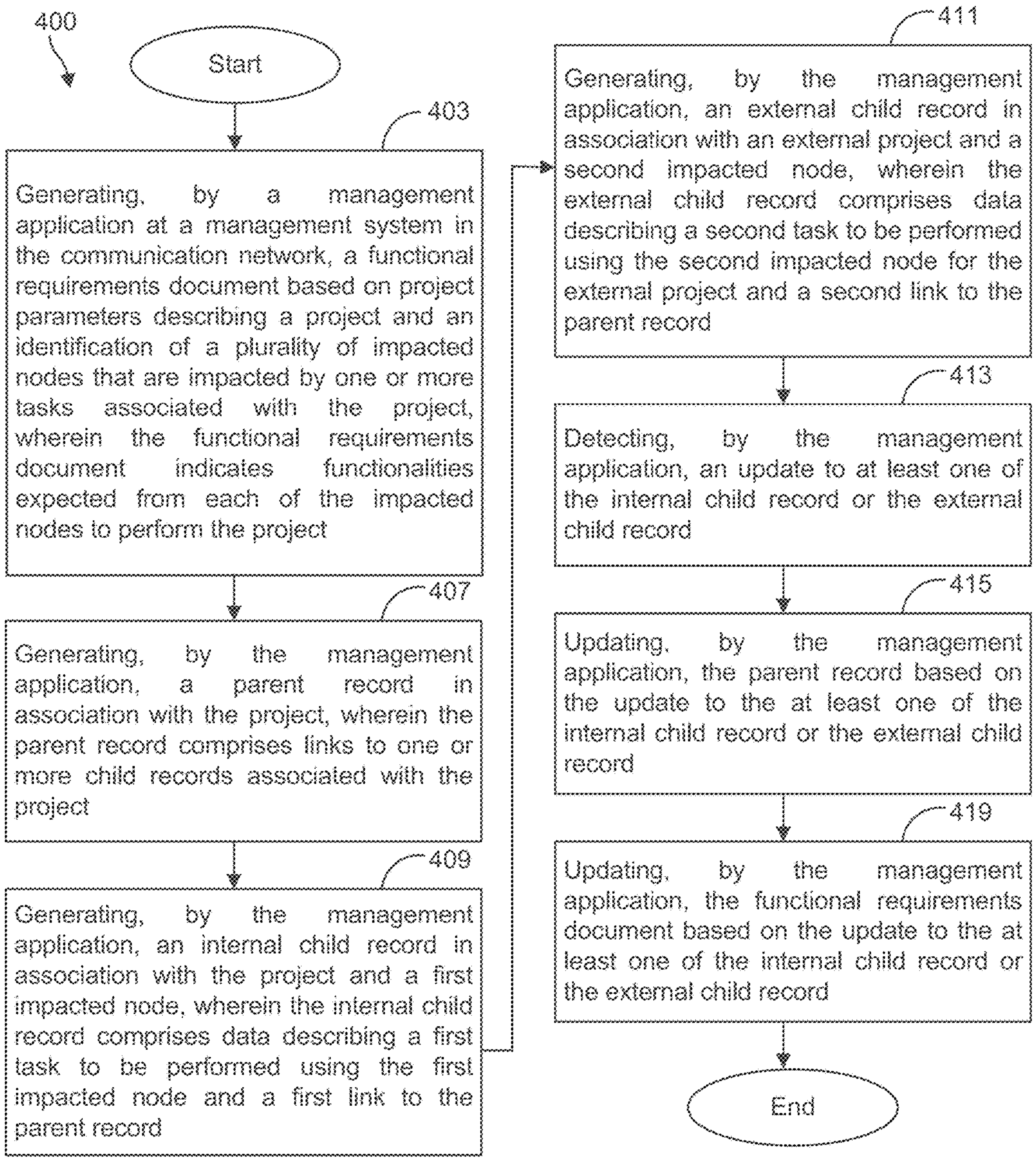
FIG. 4 is a flowchart of a first method of automated task management across impacted nodes in according to various embodiments of the disclosure.

Referring now to FIG. 4, shown is a method 400 to perform automated project and task management across one or more impacted nodes according to various embodiments of the disclosure. Method 400 may be performed by the management system 106 when a project 115 is to be completed, and managed using the management application 125 and/or service management application 127 at the management system 106.

At step 403, method 400 may comprise generating, by a management application 125 at a management system 106 in the communication network 100, a FRD 124A (hereinafter referred to as FRD 124) based on project parameters 203 describing a project 115 and an identification of a plurality of impacted nodes 112A-D (hereinafter referred to as impacted nodes 112) that are impacted by one or more tasks associated with the project 115. The FRD 124 indicates functionalities expected from each of the impacted nodes 112 to perform the project 115.

At step 407, method 400 may comprise generating, by the management application 125, a parent record 118 in association with the project 115. The parent record 118 comprises links 319 to one or more child records 121 associated with the project 115. At step 409, method 400 may comprise generating, by the management application 125, an internal child record 121 in association with the project 115 and a first impacted node 112. The internal child record 121 comprises data describing a first task 215 to be performed using the first impacted node 112 and a first link 319 to the parent record 118. At step 411, method 400 may comprise generating, by the management application 125, an external child record 121 in association with an external project 115 and a second impacted node 112. The external child record 121 comprises data describing a second task 227 to be performed using the second impacted node 112 for the external project 115 and a second link 319 to the parent record 118.

At step 413, method 400 may comprise detecting, by the management application 125, an update to at least one of the internal child record 121 or the external child record 121. At step 415, method 400 may comprise updating, by the management application 125, the parent record 118 based on the update to the at least one of the internal child record 121 or the external child record 121. At step 419, method 400 may comprise updating, by the management application 125, the FRD 124 based on the update to the at least one of the internal child record 121 or the external child record 121.

Method 400 may include other steps and/or features that are not otherwise shown in FIG. 4. In an embodiment, method 400 may comprise receiving, by the management application 125, an operational requirements document 204 comprising the project parameters 203, the identification of the impacted nodes 112, and test parameters 205 describing one or more tests 232 to be performed in association with the project 115. In an embodiment, method 400 may further comprise identifying, by the management application 125, the first impacted node 112, wherein performance of the first task 215 at the first impacted node 112 is independent from external projects, and/or identifying, by the management application 125, the second impacted node 112, wherein performance of the one or more tasks associated with the project 115 impacts the external project 115 at least partially performed using the second impacted node 112.

In an embodiment, method 400 may further comprise generating, by a service management application 127 at the management system 106, a test child record 122 in association with the project 115 and a test node 112, wherein the test child record 122 comprises data describing a test 232 to be performed using the test node 112 for the project 115 and a link 319 to the parent record 118. In an embodiment, method 400 may further comprise preventing, by the management application 125, duplicate child records 121 from being generated in response to updating the parent record 118.

In an embodiment, the parent record 118 further comprises at least one of an internal impacted node field 321 indicating the first impacted node 112, an external impacted node field 324 indicating the second impacted node, and a generate field 327. In an embodiment, at least one of the parent record 118, the internal child record 121, or the external child record 121 comprises a project source field 330 indicating a source of creating the parent record 118, the internal child record 121, or the external child record 121.

Figure 5:
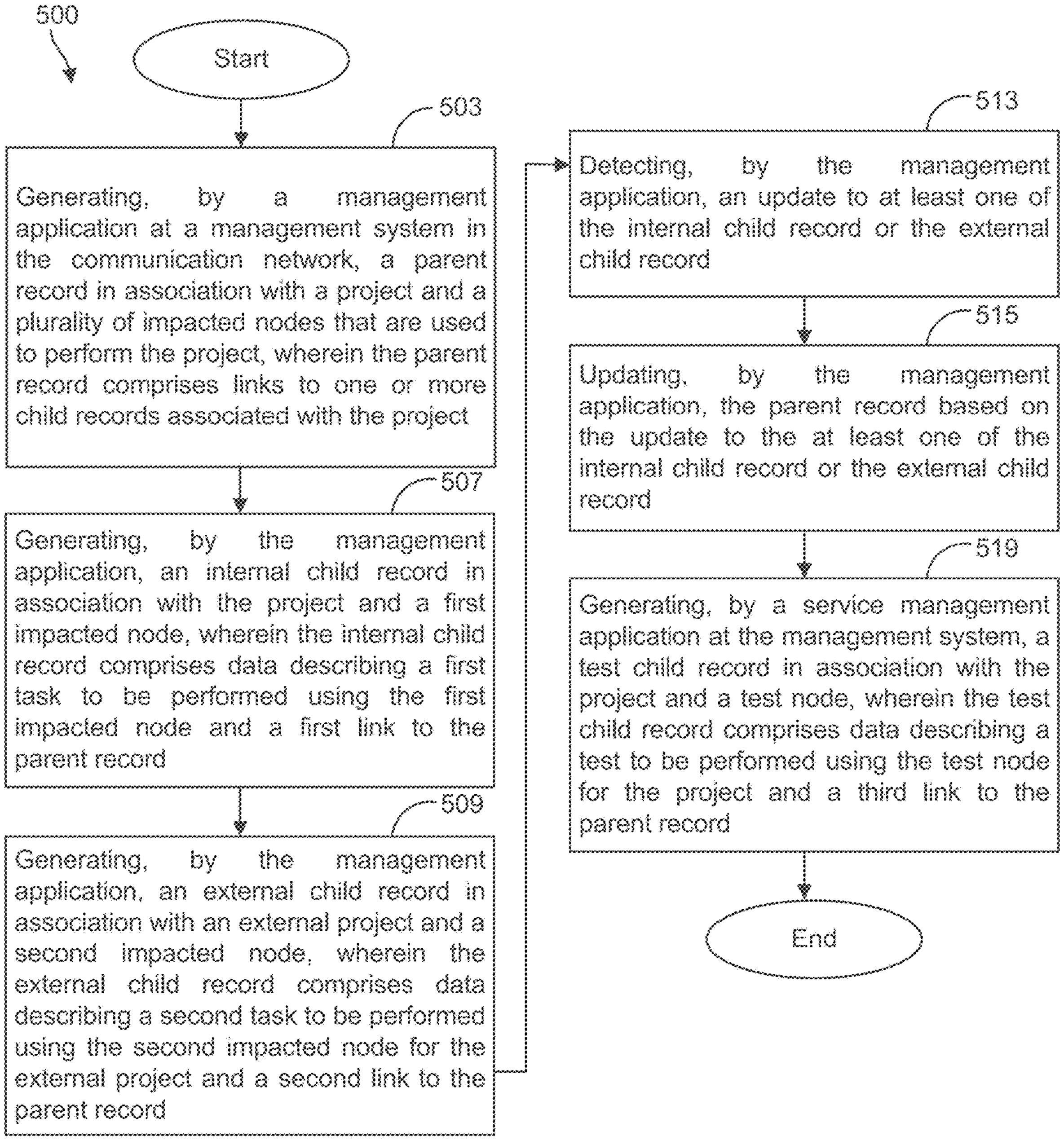
FIG. 5 is a flowchart of a second method of automated task management across impacted nodes in according to various embodiments of the disclosure.

Referring now to FIG. 5, shown is a method 500 to perform automated project and task management across one or more impacted nodes according to various embodiments of the disclosure. Method 500 may be performed by the management system 106 when a project 115 is to be completed, and managed using the management application 125 and/or service management application 127 at the management system 106.

At step 503, method 500 may comprise generating, by a management application 125 at a management system 106 in the communication network 100, a parent record 118 in association with a project 115 and impacted nodes 112 used to perform the project 115. The parent record 118 comprises links 319 to one or more child records 121 associated with the project 115. At step 507, method 500 may comprise generating, by the management application 125, an internal child record 121 in association with the project 115 and a first impacted node 112. The internal child record 121 comprises data describing a first task 215 to be performed using the first impacted node 112 and a first link 319 to the parent record 118. At step 509, method 500 may comprise generating, by the management application 125, an external child record 121 in association with an external project 115 and a second impacted node 112. The external child record 121 comprises data describing a second task 227 to be performed using the second impacted node 112 for the external project 115 and a second link 319 to the parent record 118.

At step 513, method 500 may comprise detecting, by the management application 125, an update to at least one of the internal child record 121 or the external child record 121. At step 515, method 500 may comprise updating, by the management application 125, the parent record 118 based on the update to the at least one of the internal child record 121 or the external child record 121. At step 519, method 500 may comprise generating, by a service management application 127 at the management system 106, a test child record 122 in association with the project 115 and a test node 112. The test child record 122 comprises data describing a test 232 to be performed using the test node 112 for the project 115 and a third link 319 to the parent record 118.

Method 500 may include other steps and/or features that are not otherwise shown in FIG. 5. In an embodiment, method 500 may comprise generating, by the management application 125, a FRD 124 based on project parameters 203 describing the project 115 and the impacted nodes 112 that are used to perform the project 115, wherein the FRD 124 indicates functionalities expected from each of the impacted nodes 112 to perform the project 115, and/or updating, by the management application 125, the FRD 124 based on the update to the at least one of the internal child record 121 or the external child record 121. In an embodiment, method 500 may further comprise identifying, by the management application 125, the first impacted node 112, wherein performance of the first task 215 at the first impacted node 112 is independent from external projects, and/or identifying, by the management application 125, the second impacted node 112, wherein performance of the one or more tasks associated with the project 115 impacts the external project 115 at least partially performed using the second impacted node 112.

In an embodiment, the parent record 118 further comprises at least one of an internal impacted node field 321 indicating the first impacted node 112, an external impacted node field 324 indicating the second impacted node, and a generate field 327. In an embodiment, at least one of the parent record 118, the internal child record 121, or the external child record 121 comprises a project source field 330 indicating a source of creating the parent record 118, the internal child record 121, or the external child record 121.

Figure 6:
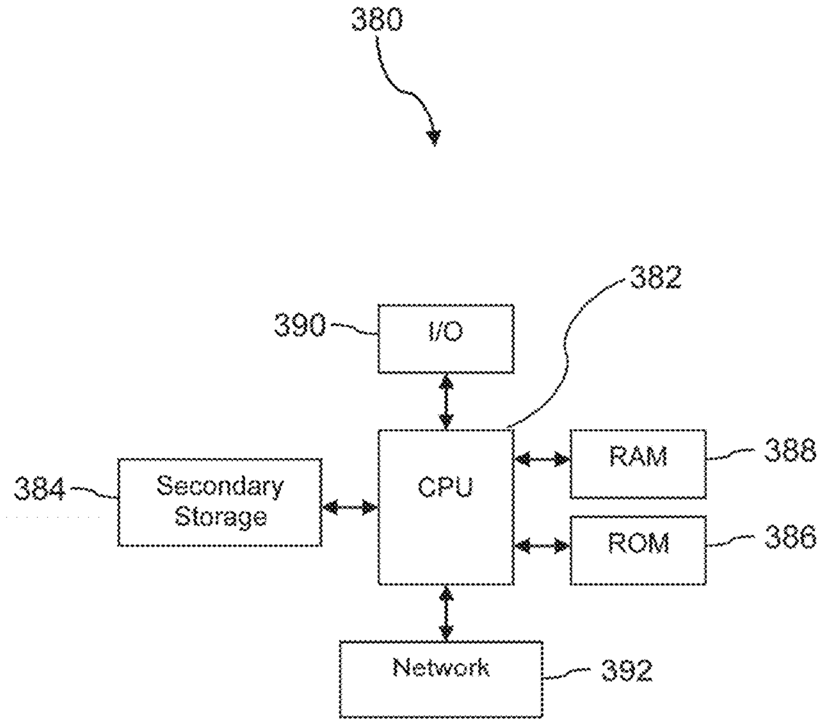
FIG. 6 is a block diagram of a computer system implemented within the communication network of FIG. 1 according to an embodiment of the disclosure.

FIG. 6 illustrates a computer system 380 suitable for implementing one or more embodiments disclosed herein. In an embodiment, client 103, management system 106, and/or impacted nodes 112A-D may each be implemented as the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a communication network to perform automated project and task management across one or more impacted nodes, wherein the method comprises:

generating, by a management application at a management system in the communication network, a parent record in association with a project and a plurality of impacted nodes that are used to perform the project, wherein the parent record comprises links to one or more child records associated with the project, and wherein each of the plurality of impacted nodes comprises at least one of a hardware network element, a software service, an electronic router, an electronic switch, a virtual private network, or an application executing in the communication network that performs computational tasks for one or more projects;

generating, by the management application, an internal child record in association with the project and a first impacted node, wherein the internal child record comprises data describing a first task to be performed using the first impacted node and a first link to the parent record, and wherein performance of the first task at the first impacted node is independent of computational tasks being performed at the first impacted node for any external project;

determining, by the management application, that performance of the first task for the project using the first impacted node impacts a value computed for an external project at a second impacted node, wherein the second impacted node concurrently executes computational tasks for both the project and the external project, and wherein performing the first task causes a change to a computational state or stored value at the second impacted node that would produce an incorrect computational result for the external project;

generating, by the management application, an external child record in association with the external project and the second impacted node, wherein the external child record comprises data describing a second task to be performed using the second impacted node for the external project and a second link to the parent record, wherein the second task comprises a corrective operation to prevent or correct a computational impact caused by performance of the first task, wherein the corrective operation comprises at least one of a debug operation or a reverse task operation that adjusts the value associated with the second impacted node that is changed by performing the first task, thereby restoring a correct computational state at the second impacted node for the external project;

detecting, by the management application, an update to at least one of the internal child record or the external child record;

updating, by the management application, the parent record based on the update to the at least one of the internal child record or the external child record; and generating, by a service management application at the management system, a test child record in association with the project and a test node, wherein the test child record comprises data describing a test to be performed using the test node for the project and a third link to the parent record.

2. The method of claim 1, further comprising generating, by the management application, a functional requirements document based on project parameters describing the project and the impacted nodes that are used to perform the project, wherein the functional requirements document indicates functionalities expected from each of the impacted nodes to perform the project.

3. The method of claim 2, further comprising updating, by the management application, the functional requirements document based on the update to the at least one of the internal child record or the external child record.

4. The method of claim 1, further comprising:

identifying, by the management application, the first impacted node, wherein performance of the first task at the first impacted node is independent from other projects; and identifying, by the management application, the second impacted node, wherein performance of one or more tasks associated with the project impacts the external project at least partially performed by the second impacted node.

5. The method of claim 1, wherein the parent record further comprises at least one of an internal impacted node field indicating the first impacted node, an external impacted node field indicating the second impacted node, and a generate field.

6. A method implemented in a communication network to perform automated project and task management across one or more impacted nodes, wherein the method comprises:

generating, by a management application at a management system in the communication network, a functional requirements document based on project parameters describing a project and an identification of a plurality of impacted nodes that are impacted by one or more tasks associated with the project, wherein the functional requirements document indicates functionalities expected from each of the impacted nodes to perform the project, and wherein each of the plurality of impacted nodes is a network element in the communication network that executes computational tasks and comprises at least one of hardware equipment, a software service, an electronic router, an electronic switch, a virtual private network, or an application;

generating, by the management application, a parent record in association with the project, wherein the parent record comprises links to one or more child records associated with the project;

generating, by the management application, an internal child record in association with the project and a first impacted node, wherein the internal child record comprises data describing a first task to be performed using the first impacted node and a first link to the parent record;

determining, by the management application, that performance of the first task for the project using the first impacted node impacts a value computed for an external project at a second impacted node, wherein the second impacted node is a network element that concurrently executes computational tasks for both the project and the external project;

generating, by the management application, an external child record in association with the external project and the second impacted node, wherein the external child record comprises data describing a second task to be performed using the second impacted node for the external project and a second link to the parent record, wherein the second task comprises a corrective operation to prevent or correct a computational impact caused by performance of the first task at the second impacted node, wherein the corrective operation comprises at least one of a debug operation or a reverse task operation that adjusts the value associated with the second impacted node that is changed by performing the first task;

detecting, by the management application, an update to at least one of the internal child record or the external child record;

updating, by the management application, the parent record based on the update to the at least one of the internal child record or the external child record; and updating, by the management application, the functional requirements document based on the update to the at least one of the internal child record or the external child record by modifying an expected functionality of the second impacted node to reflect a change in function of the second impacted node resulting from the update to the at least one of the internal child record or the external child record.

7. The method of claim 6, further comprising receiving, by the management application, an operational requirements document comprising the project parameters, the identification of the impacted nodes, and test parameters describing one or more tests to be performed in association with the project.

8. The method of claim 6, further comprising identifying, by the management application, the first impacted node, wherein performance of the first task at the first impacted node is independent from external projects.

9. The method of claim 6, further comprising identifying, by the management application, the second impacted node, wherein performance of the one or more tasks associated with the project impacts the external project at least partially performed using the second impacted node.

10. The method of claim 6, further comprising generating, by a service management application at the management system, a test child record in association with the project and a test node, wherein the test child record comprises data describing a test to be performed using the test node for the project and a link to the parent record.

11. The method of claim 6, wherein the parent record further comprises at least one of an internal impacted node field indicating the first impacted node, an external impacted node field indicating the second impacted node, and a generate field.

12. The method of claim 6, further comprising preventing, by the management application, duplicate child records from being generated in response to updating the parent record.

13. The method of claim 6, further comprising generating, by the management application, a second internal child record in association with the project and a third impacted node based on the update to the at least one of the internal child record or the external child record.

14. The method of claim 6, wherein at least one of the parent record, the internal child record, or the external child record comprises a project source field indicating a source of creating the parent record, the internal child record, or the external child record.

15. A system, comprising:

at least one processor;

at least one non-transitory memory coupled to the processor;

a management application, stored in the at least one non-transitory memory, which when executed by the at least one processor, causes the management application to be configured to:

generate a functional requirements document based on project parameters describing a project and an identification of a plurality of impacted nodes that are impacted by one or more tasks associated with the project, wherein the functional requirements document indicates functionalities expected from each of the impacted nodes to perform the project, and wherein each of the plurality of impacted nodes is a network element comprising at least one of hardware equipment, a software service, an electronic router, an electronic switch, a virtual private network, or an application executing in the communication network, each network element executing computational tasks for one or more projects;

generate a parent record in association with the project, wherein the parent record comprises links to one or more child records associated with the project;

generate an internal child record in association with the project and a first impacted node, wherein the internal child record comprises data describing a first task to be performed using the first impacted node and a first link to the parent record;

determine that performance of the first task for the project using the first impacted node impacts a value computed for an external project at a second impacted node, wherein the second impacted node concurrently executes computational tasks for both the project and the external project, and wherein performing the first task changes a computational state or stored value at the second impacted node;

generate an external child record in association with the external project and the second impacted node, wherein the external child record comprises data describing a second task to be performed using the second impacted node for the external project and a second link to the parent record, wherein the second task comprises a corrective operation to prevent or correct a computational impact caused by performance of the first task, wherein the corrective operation comprises at least one of a debug operation or a reverse task operation that adjusts the value associated with the second impacted node that is changed by performing the first task;

generate a test child record in association with the project and a test node, wherein the test child record comprises data describing a test to be performed using the test node for the project and a third link to the parent record;

detect an update to at least one of the internal child record, the external child record, or the test child record;

update the parent record based on the update to the at least one of the internal child record, the external child record, or the test child record; and update the functional requirements document based on the update to the at least one of the internal child record, the external child record, or the test child record.

16. The system of claim 15, wherein the internal child record is in association with the project and comprises a status field indicating progress of the first task.

17. The system of claim 15, wherein the external child record is in association with the external project and comprises data indicating a dependency between the first task and the second task.

18. The system of claim 15, wherein the external child record is in association with the external project, and wherein the management application is further configured to identify the second impacted node as being associated with the external project and impacted by the project.

19. The system of claim 15, wherein the parent record further comprises at least one of an internal impacted node field indicating the first impacted node, an external impacted node field indicating the second impacted node, and a generate field.

20. The system of claim 15, wherein the management application is further configured to prevent duplicate child records from being generated in response to the parent record being updated.

* * * * *